(12) United States Patent  
Seok

(10) Patent No.: US 6,267,236 B1
(45) Date of Patent: Jul. 31, 2001

(54) PROTECTIVE CASE FOR PORTABLE COMPUTER

(75) Inventor: Jeong-Hwan Seok, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/451,932

(22) Filed: Dec. 1, 1999

(30) Foreign Application Priority Data

Dec. 2, 1998 (KR) .................................................. 98-52631

(51) Int. Cl.⁷ .................................................. B65D 85/00
(52) U.S. Cl. .......................... 206/320; 281/19.1; 281/34
(58) Field of Search .................................. 206/305, 320, 206/424, 576; 281/19.1, 23, 34, 45; 24/457

(56) References Cited

U.S. PATENT DOCUMENTS

| | | | |
|---|---|---|---|
| 2,015,302 | * 9/1935 | Enoch | 281/19.1 |
| 2,603,507 | * 7/1952 | Kensey | 281/19.1 |
| 3,018,532 | * 1/1962 | Rinaldi | 281/19.1 |
| 4,229,022 | * 10/1980 | Grundell | 281/45 |
| 4,351,546 | * 9/1982 | Cognata | 281/45 |
| 4,486,032 | * 12/1984 | Leahy | 281/45 |
| 5,002,184 | 3/1991 | Lloyd . | |
| 5,074,413 | 12/1991 | Ikuta et al. . | |
| 5,160,001 | 11/1992 | Marceau . | |
| 5,325,970 | 7/1994 | Dillon et al. . | |
| 5,485,922 | 1/1996 | Butcher . | |
| 5,607,054 | 3/1997 | Hollingsworth . | |
| 5,632,373 | 5/1997 | Kumar et al. . | |
| 5,765,873 | * 6/1998 | Chen | 281/45 |
| 5,775,497 | * 7/1998 | Krulik | 206/320 |
| 5,835,344 | 11/1998 | Alexander . | |
| 5,938,241 | * 8/1999 | Wilson | 281/45 |
| 5,944,353 | * 8/1999 | Sato | 281/45 |

* cited by examiner

Primary Examiner—Luan K. Bui
(74) Attorney, Agent, or Firm—Robert E. Bushnell, Esq.

(57) ABSTRACT

A protective case for protecting and covering a portable computer having an upper surface, a lower surface and a side surface includes a first surface, a second surface, a connecting member and a plurality of elastic members. The first surface covers the upper surface of the portable computer, and the second surface covers the lower surface of the portable computer. The connecting member covers the side surface of the portable computer and connects the first surface and the second surface. The elastic members are inserted into the connecting member to enforce the connecting member to be attached to the portable computer.

28 Claims, 8 Drawing Sheets

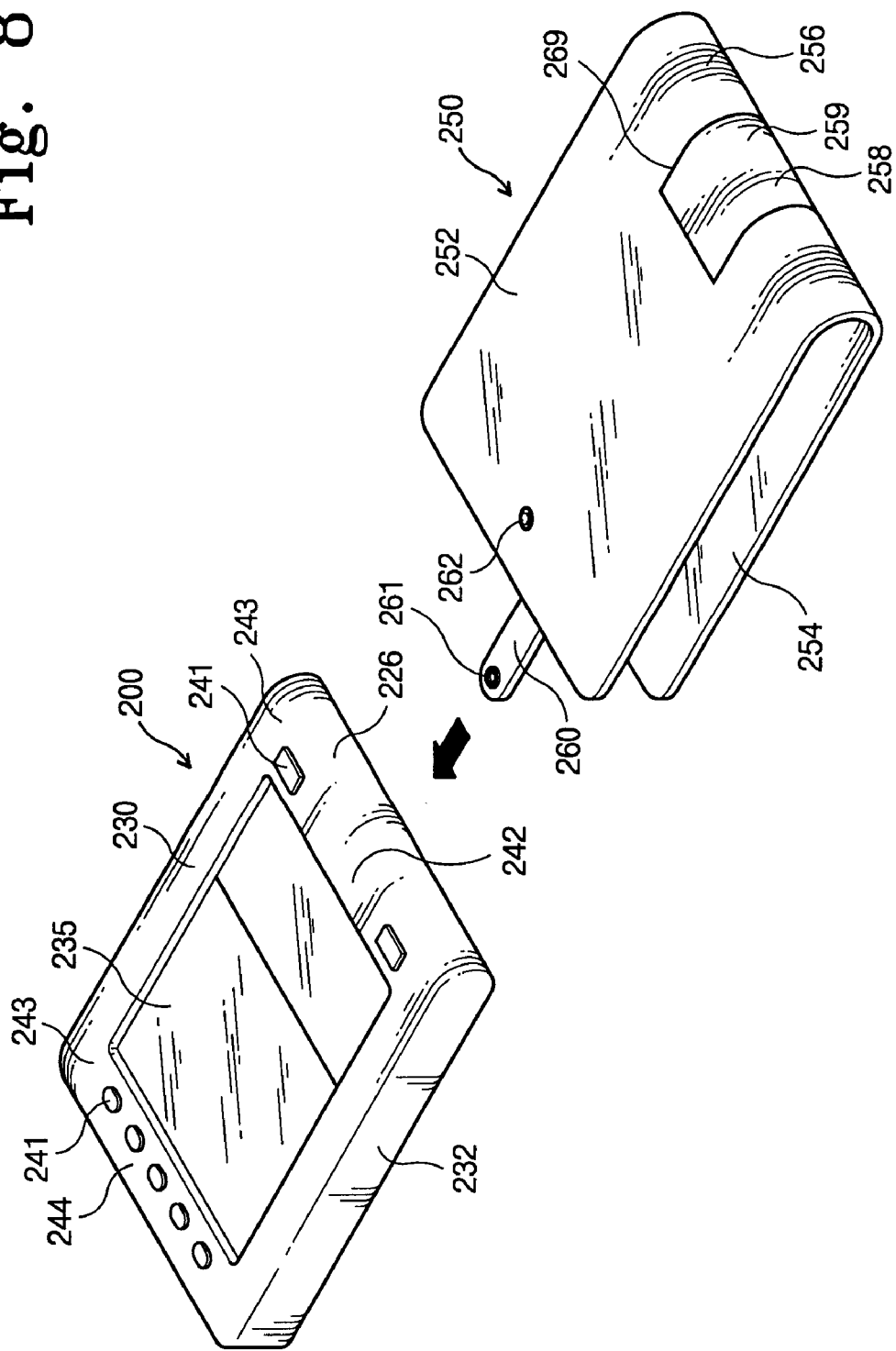

PROTECTIVE CASE FOR PORTABLE COMPUTER

CLAIM OF PRIORITY

This application makes reference to, incorporates the same herein, and claims all benefits accruing under 35 U.S.C.§ 119 from an application for A CASE FOR A PORTABLE COMPUTER earlier filed in the Korean Industrial Property Office on Dec. 2, 1998 and there duly assigned Ser. No. 1998/52631.

BACKGROUND OF THE INVENTION

1. Field of the Invention

The present invention relates generally to a protective case for a portable computer and, more particularly, to a protective case having an elastic member holding a portable computer.

2. Description of the Related Art

Various types of cases have been used for protecting a portable computer. Typically, the portable computer is inserted into a carrying case or a brief case for the purpose of the protection. The cases are designed to accommodate and protect the portable computer when the portable computer is fully inserted into and completely covered by the case.

The design of the portable computer has been continuously evolved. The faster, smaller and more versatile the computer becomes, the more widely the computer is used. The computer including a specific function such as word processing, data collection, or item identification may be all-purpose machines capable of computing and running a variety of types of software programs. These portable personal computers may interact with a variety of portable and stationary peripheral input/output devices such as printers, light pens, image scanners, video scanners, recordable memories and new cameras. Moreover, these computers may have an electric power cord for receiving power from a standard electric outlet as well as a battery pack for powering the unit when an electric outlet is unavailable or is inconvenient. The portability and versatility of portable computers, in combination with the ever reduced size and weight of these machines, has attracted a significant number of users.

Nevertheless, the cases protecting the portable computer are not small, light, and effective enough to cover, carry, and protect the portable computer. I have found that with conventional apparatus and methods, it is not possible to a more perfect protective case for protecting and covering the portable computer.

Efforts to protect the portable computer has spawned various types of carrying cases. For example, U.S. Pat. No. 5,835,344 for a Portable Computer System With Integral Carrying Case issued to Alexander discloses an integral multi-purpose carrying case. U.S. Pat. No. 5,632,373 for a Protective Case for Portable Computer issued to Kummar at al. proposes a protective case for housing a portable computer and including a key board case and a display case, while U.S. Pat. No. 5,485,922 for a Portable Computer Carry Case Assembly issued to Butcher shows a portable computer carry case including several compartments. U.S. Pat. No. 5,325,970 for a Carrying Case for Portable Computers issued to Dillon at al. contemplates a computer carrying case containing non-reflective folding panels and U.S. Pat. No. 5,160,001 for a Computer Carrying Case issued to Marceau suggests a soft combination briefcase and carrying case for suspending the computer unit in the central zone of the carrying case. U.S. Pat. No. 5,074,413 for a Carrying Case issued to Ikuta et al. uses a carrying case having a grip portion and interior accommodating accessories. I have noticed that the embodiments described by these references fail to show a case that is both small and lighter weight while effective enough to cover and protect the portable computer.

U.S. Pat. No. 5,607,054 for a Folio Carrying Case for Notebook Computer issued to Hollingsworth discloses a carrying case having front and back panels, a top panel, a bottom panel, a closure flap, and a pair of tabs serving as a computer stand when in the open position while U.S. Pat. No. 5,002,184 for a Soft Case Protection for a Hand Held Computer issued to Lloyd shows a soft case including a base cover portion and a top cover portion having a flat, soft form pad engaging the glass screen of the monitor. I have found that these embodiments do not provide a soft and light weight, small case for covering and protecting the computer and that it is difficult and often inconvenient to use the conventional case for carrying a relatively small portable computer in consideration of the recently developed portable computers such as palm top and lap top computers that remains relatively lightweight and compact in size.

SUMMARY OF THE INVENTION

It is an object of the present invention to provide an improved case for protecting a portable computer.

It is another object to provide a case able to cover a portable computer.

It an yet another object to provide a case that is sized to fit a light weight portable computer.

It is still another object to provide a compact case for covering the portable computer.

It is still yet object to provide a case hold the portable computer tightly.

It is further object to provide a case for covering the portable computer with a rigid, elastic portion and a soft, flexible portion.

It is also an object to provide a case capable of being easily attached to and removed from the portable computer.

These and other objects may be achieved by providing a light and flexible protective case for covering, protecting, and holding a portable computer such as a palm top computer, a notebook computer, or a lap top computer having a upper surface and a lower surface separated by at least one side surface. The protective case includes a first surface, a second surface, a connecting member and a plurality of elastic members. The first surface covers the upper surface of the portable computer while the second surface covers the lower surface of the portable computer and the connecting member covers at least one side surface of the portable computer and connects the first surface and the second surface together. A plurality of elastic members are inserted into the connecting member to enforce the connecting member to be attached to and to hold the portable computer. The first and second surfaces and a portion of the connecting member are soft and flexible while the other portion of the connecting member to which an elastic member is attached, is bendable, flexible and elastic. The first surface, the second surface and the connecting member of the protective case are made of the leather while the elastic members are composed of at least one flexible thin sheet.

When the portable computer includes a keyboard, a display pivotally attached to the keyboard and a hinge member for connecting the display to the keyboard, the protective case is designed to include a first surface adapted to cover the keyboard, a second surface adapted to cover the display, a connecting member covering the hinge member of the portable computer and connecting the first surface and the second surface, and a plurality of elastic members inserted into the connecting member to maintain the connecting member attached to the portable computer. When the a palm computer includes a bottom surface and a top surface having a display window, a key portion, and a non-key portion, the elastic member is attached to the connecting member at a location corresponding to the non-key portion of the top surface to avoid obstructing the key portion with the elastic member.

BRIEF DESCRIPTION OF THE DRAWINGS

The preferred A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIG. 8 is a perspective view of another embodiment of the protective case according to the principle of the present invention.

DESCRIPTION OF THE PREFERRED EMBODIMENT

Figure 1:
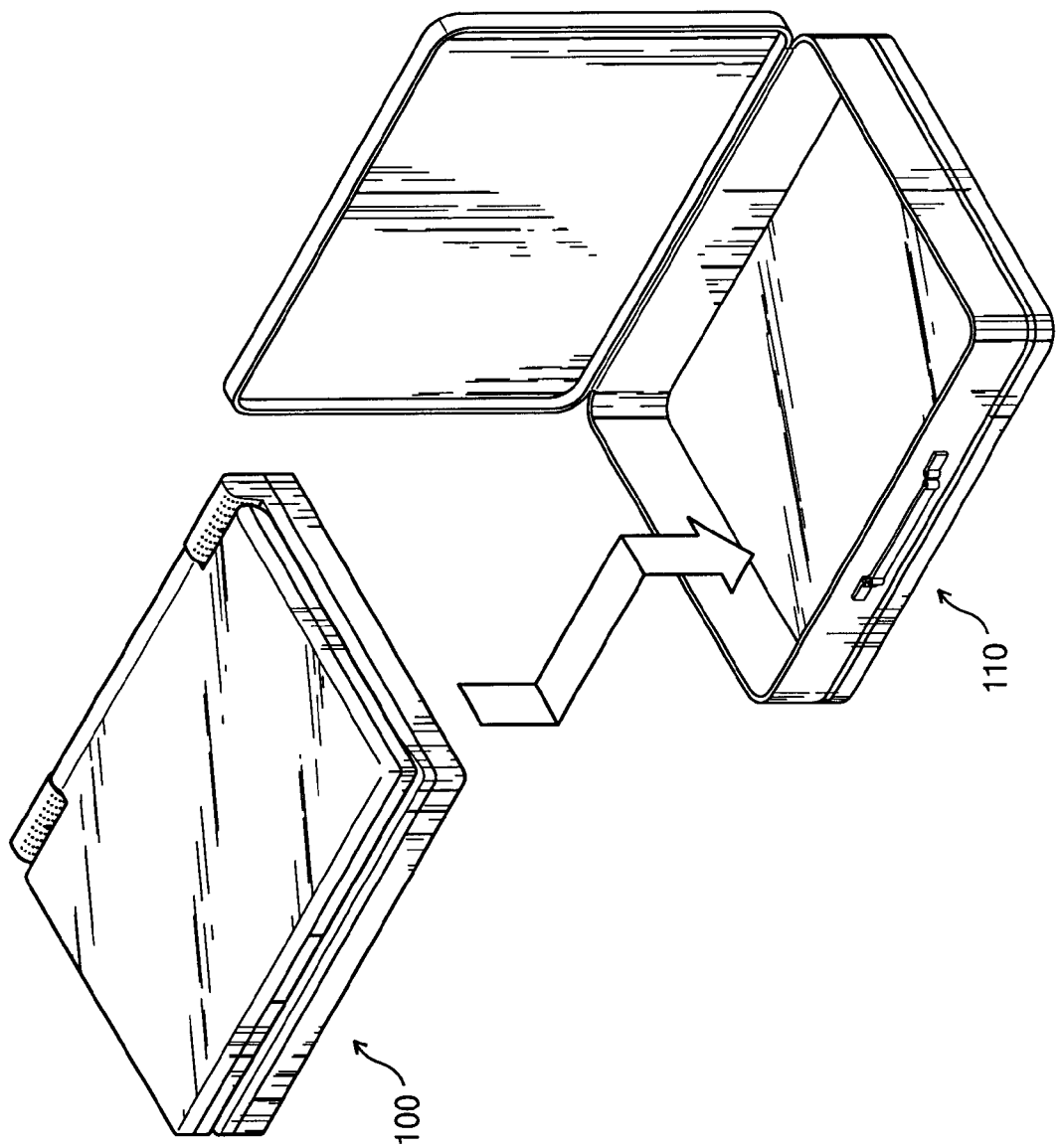
FIG. 1 is a perspective view of a notebook and a case for carrying the notebook.

Turning now to the drawings, FIG. 1 shows a notebook computer or a portable computer 100 and a conventional case 110 for carrying notebook computer 100. Generally, conventional case 110 is designed to suitable fit notebook computer 100 in size for the purpose of accommodating and carrying notebook computer 100.

Figure 2:
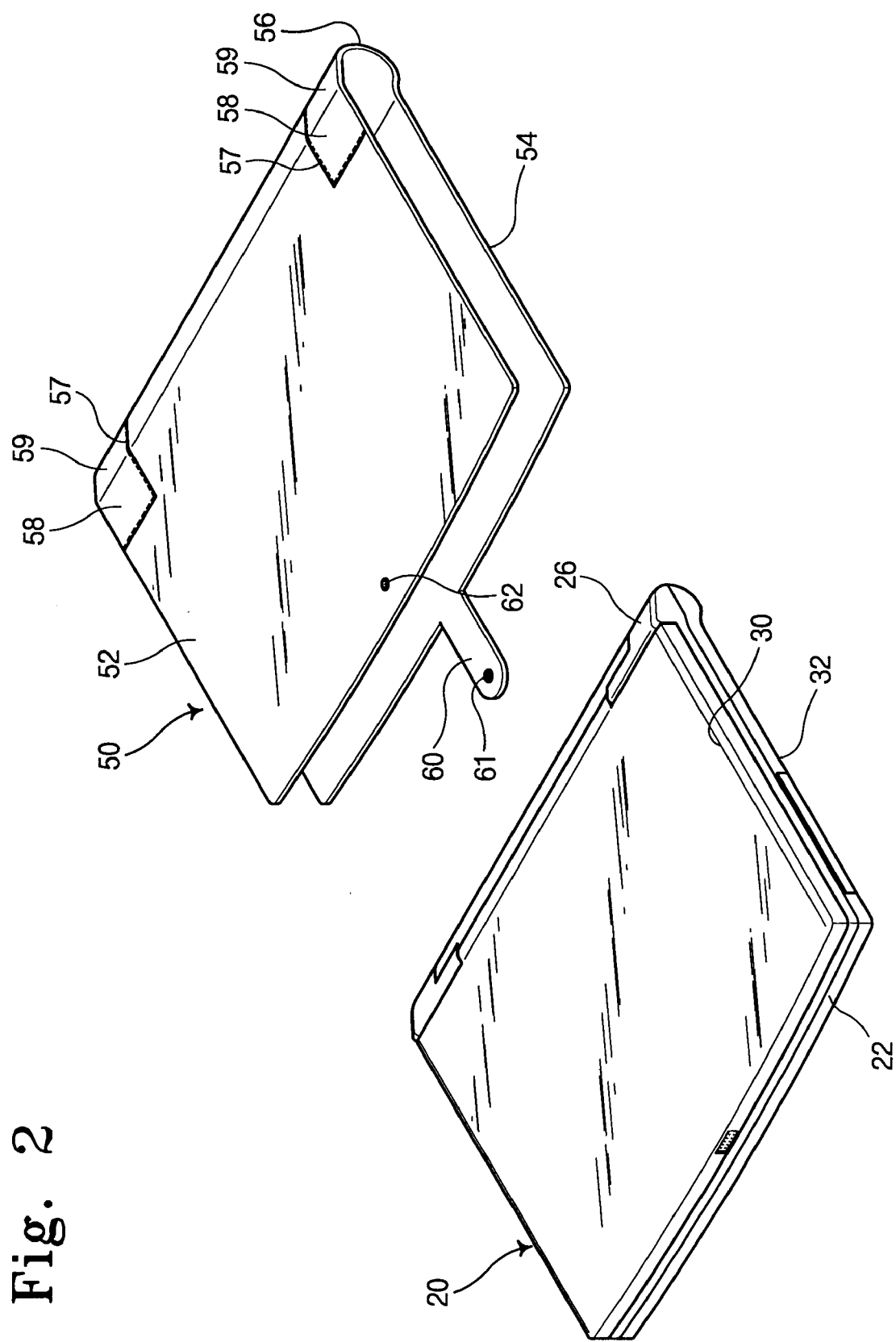
FIG. 2 is a perspective view of a portable computer and a protective case of the present invention.
Figure 3:
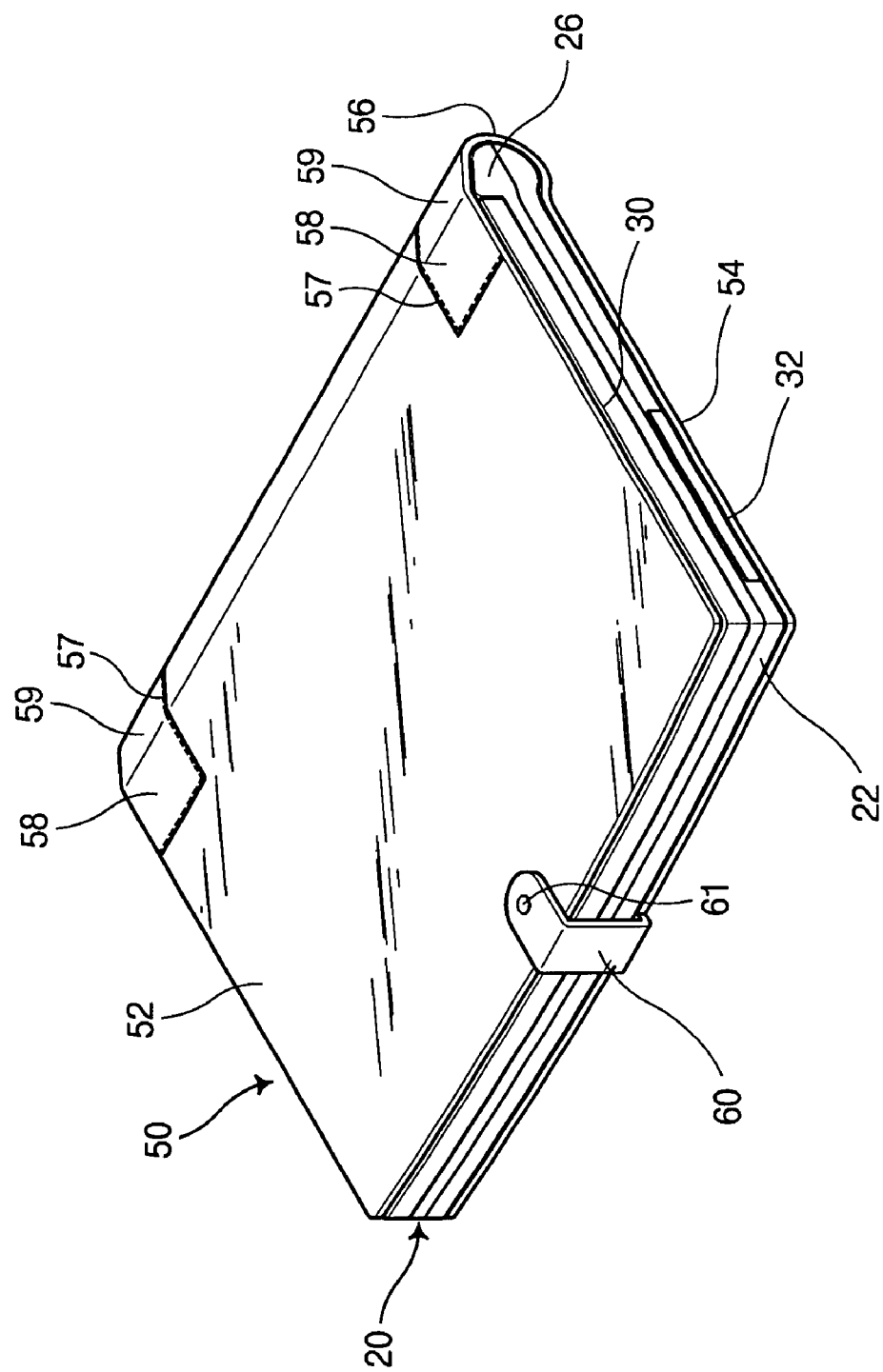
FIG. 3 is a perspective view of the protective case of the present invention in combination with the portable computer.

Referring to FIG. 2 and FIG. 3 together, a portable computer 20, for example the HP 200 LX Palm Top PC manufactured by Hewlett Packard of Portland, Oreg., is inserted into a protective case 50. The portable computer such as palm top or lap top computer generally includes an top housing 30 housing a display screen, a base housing 32 incorporating a keyboard and a hinge portion 26 capable of attaching top housing 30 pivotally to base housing 32 via a hinge pin (not shown) of hinge portion 26. Top housing 30 may move between a closed position whereby the display screen (not visible while computer 20 is in its closed position) of top housing 30 covers keyboard of base housing 32 as shown in FIG. 2 and an open position whereby top housing 30 rotates about an axis within hinge portion 26 in order for a user to use the key board and touch pad of the portable computer 20 while viewing the screen of the monitor. This structure of the portable computer 20 is often referred to as a clam shell structure.

Protective case 50 of the present invention includes a first cover or a first leaf 52, a second cover or a second leaf 54 and a connecting member 56 as a bendable hinge portion which are composed of a flexible, pliable and soft material such as leather. A hard, non flexible material can be attached to a portion of first cover 52, second cover 54, or connecting member 56 to protect a fragile portion or a connecting portion of portable computer 20 such as a monitor screen or a liquid crystal device screen. Connecting member 56 is disposed between first cover 52 and second cover 54 and is designed to connect first cover 52 and second cover 54. Second cover 54 includes a band 60 protruding outwardly from one end of second cover 54. Band 60 includes a button 61 fitting a button hole 62 formed on first cover 52. Button 61 and button hole 62 may be replaced by mating strips such as loop material and hook material which mate each other in order to connect first cover 52 and second cover 54. The shape of first and second covers 52, 54 and connecting member 56 may be designed to a variety of forms according to the shape of the portable computer 20 to be housed in protective case 50.

Figure 5A:
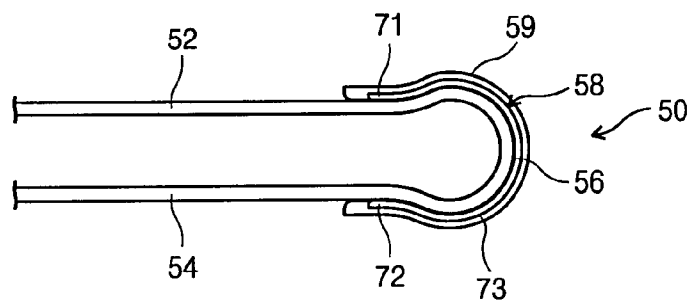
FIGS. 5A, 6A, and 7A are cross sectional views illustrating details showing the protective case constructed for three different embodiments according to the principles of the present invention.
Figure 5B:
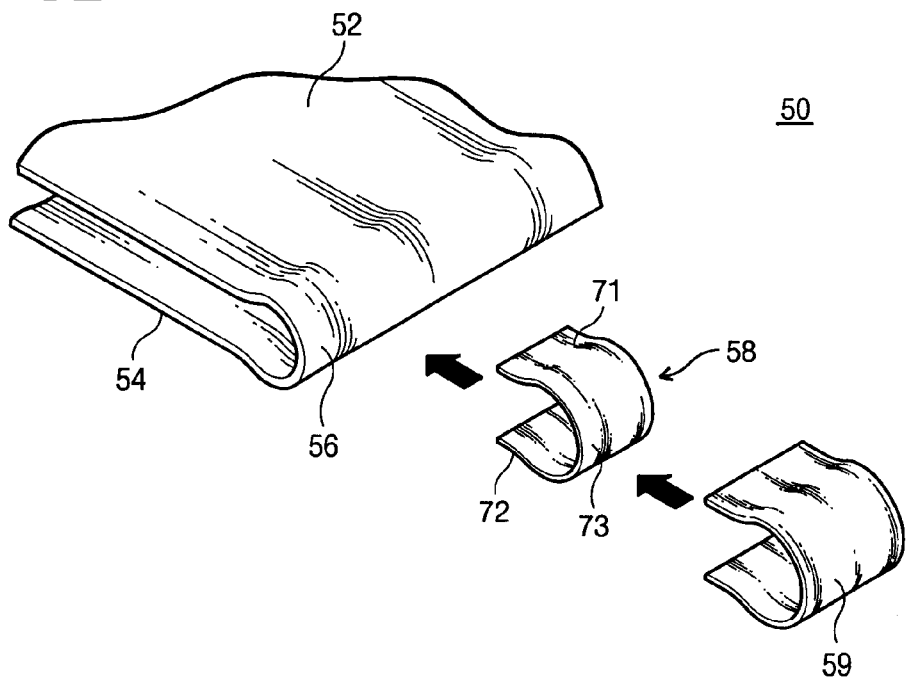
FIGS. 5B, 6B, and 7B are exploded isometric perspective views of these embodiments of the protective case constructed according to the principles of the present invention.
Figure 5C:
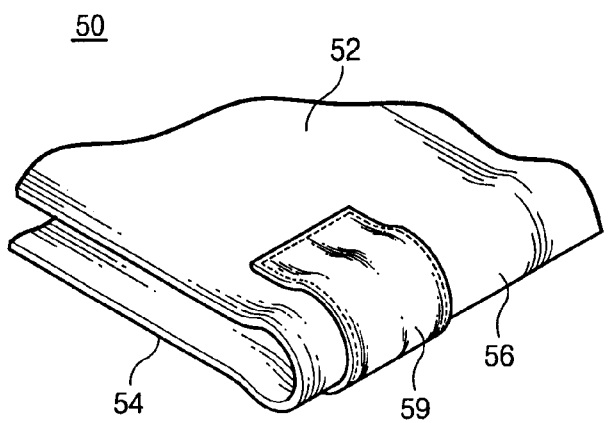
FIGS. 5C, 6C, and 7C are perspective views of these embodiments of the protective case constructed according to the principles of the present invention.

A pair of biased elastic members 58 such as a plate spring made, for example, of steel leaf or a plastic, are inserted into or attached to connecting member 56. Elastic members 58 are attached to two spaced apart portions of connecting member 56 positioned at the corresponding two hinge portions 26 of portable computer 20. Elastic member 58 is made of at least one flexible, elastic, thin sheet and shaped similar to the shape of hinge portion 26 of portable computer 20. A pair of extended plates 71 and 72 of elastic member 58 are connected by a bending portion 73 that force extended plates 71 and 72 to face each other and maintain a predetermined distance between extended plates 71 and 72 as shown in FIGS. 5A–5C. The elastic members 58 inserted into connecting member 56 is biased as, for example, by preforming to return to its closed state as shown in FIGS. 2 and 3, the elastic member 58 forces connecting member 56 to hold portable computer 20 under the influence of a bias force of elastic member 58. In the embodiment of the present invention, the protective case 50 is constructed of leather or a variety of other flexible materials. After elastic member 58 is inserted into or attached to a portion of connecting member 56, a hinge cover 59 is attached to elastic member 58 or connecting member 56 by using a thread 57 or adhesive so as to cover or completely conceal elastic member 58 as shown in FIGS. 5A–5C.

When portable computer 20 is inserted into protective case 50, top housing 30 is covered with first cover 52 while base housing 32 is covered with second cover 54. Hinge portion 26 contacts connecting member 56 and band 60 is latched on first cover 52 while covering front surface 22 of portable computer 20 as shown in FIG. 3. In order to connecting member 56 to tightly hold hinge portion and avoiding slipping to clip off and being uncovered in a closed position, a first diametric dimension of hinge portion 26 is bigger than a second diametric dimension of elastic member 58 while in a rest position and while not embracing the hinge portion 26. The protective case 50 is uncovered from portable computer 20 by being slipped to clip off from hinge portion 26 when user opens top housing to use portable computer 20.

Figure 4A:
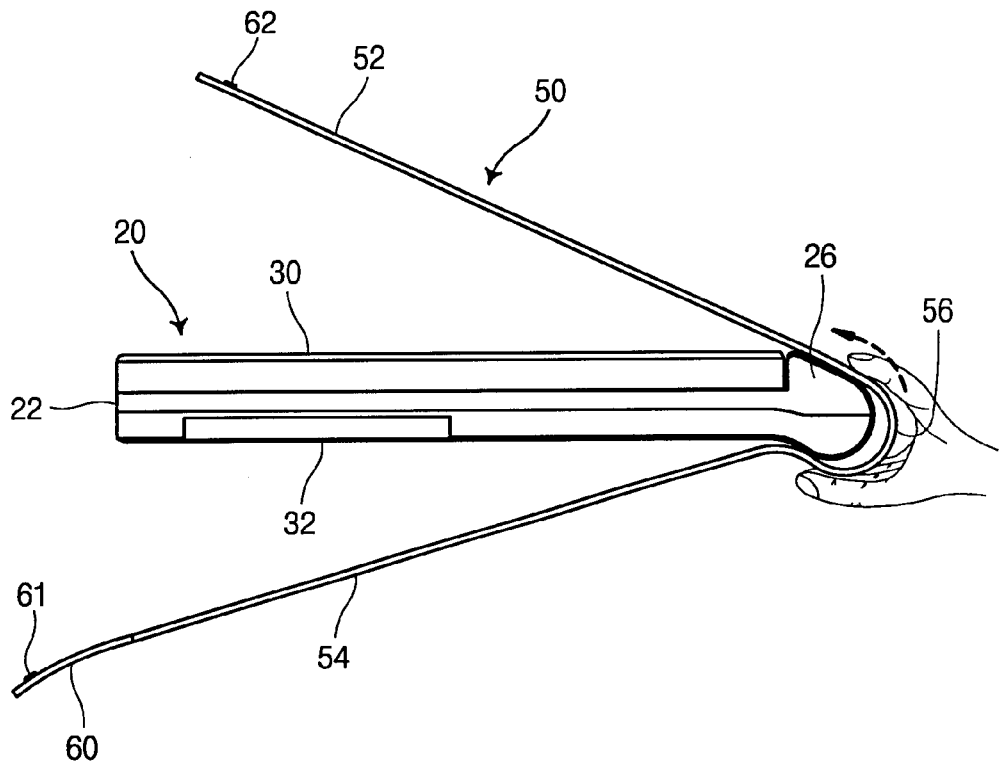
FIGS. 4A and 4B are side views of the protective case and the portable computer showing a manner of coupling the portable computer to the protective case.
Figure 4B:
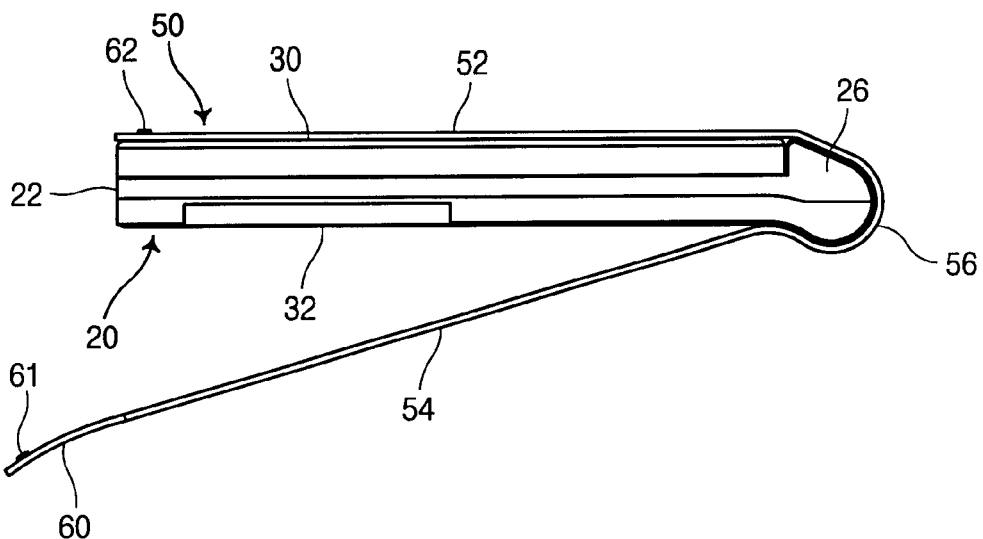

FIGS. 4A and 4B are side views of the protective case and the portable computer showing a manner of coupling the portable computer to the protective case. The inside of connecting member 56 of protective case 50 contacts the outside of hinge portion 26 of portable computer 20. By the insertion of hinge portion 26 into inside of connecting member 56 equipped with elastic member 58, the elastic force of elastic member 58 causes connecting member 56 to hold portable computer 20 tightly. When the insertion is completed, portable computer 20 is fully contained in protective case 50, and then band 60 is latched. In this manner, the portable computer 20 is easily combined with protective case 50.

FIGS. 5A, 5B, and 5C show a first embodiment of protective case 50. Elastic member 58 is attached to outside of connecting member 56. Upper plate 71 contacts the upper side of connecting member, and lower plate 72 contacts the lower side of connecting member while bending portion 73 contacts the central portion of connecting member 56. Hinge cover 59 is attached to the outside of connecting member 56 to cover elastic member 58 by using an adhesive or a thread as shown in FIGS. 2 and 3. Thus, elastic member 5b is hidden by hinge cover 59 and cannot be seen.

Figure 6A:
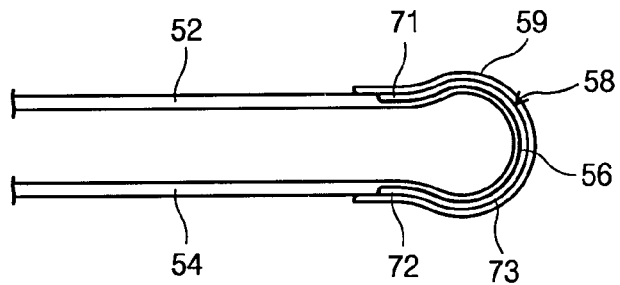
Figure 6B:
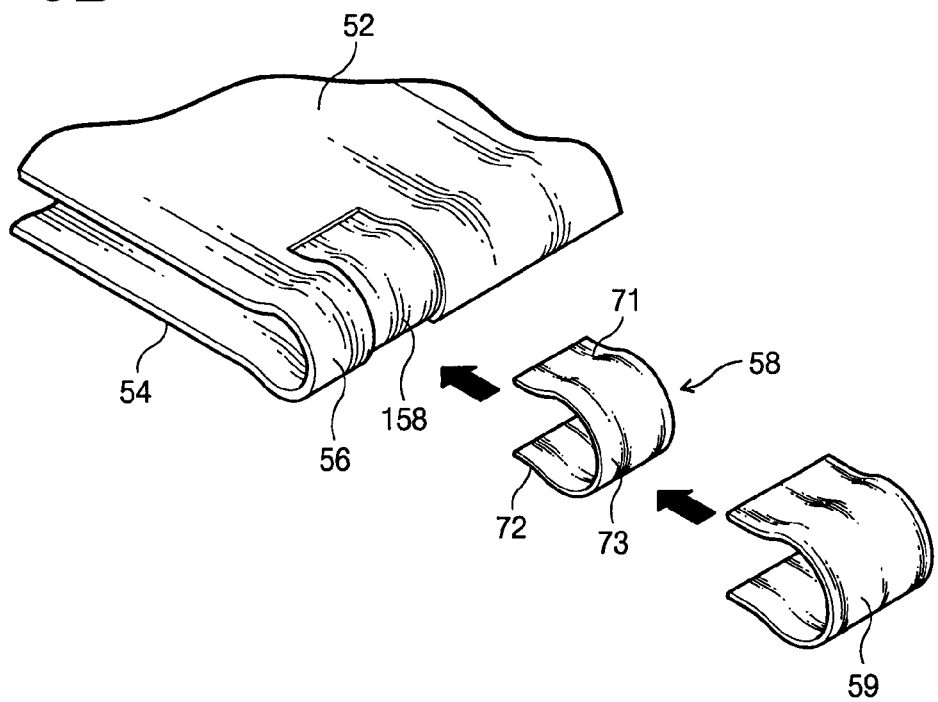
Figure 6C:
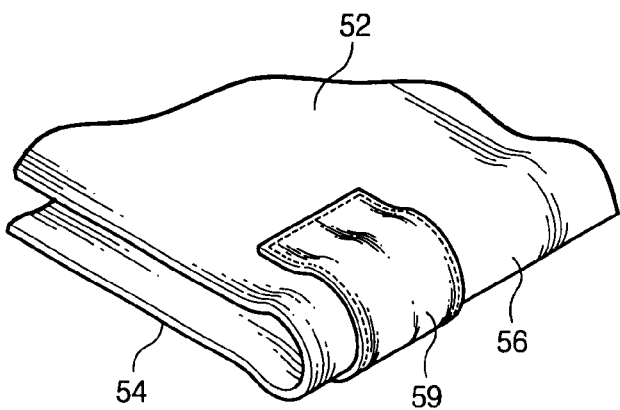

FIGS. 6A, 6B, and 6C show a second embodiment of protective case 50. A receptacle 158 is formed on connecting member 56 to accommodate elastic member 58. The thickness of connecting member 56 is the same as the summation of the thickness of elastic member 58 and the thickness of the portion of connecting member on which receptacle 158 is formed. Hinge cover 59 is attached to the outside of connecting member 56 to cover elastic member 58 by using an adhesive or a thread as shown in FIGS. 2 and 3. Thus, elastic member and receptacle 158 are hidden by hinge cover 59 cannot be seen.

Figure 7A:
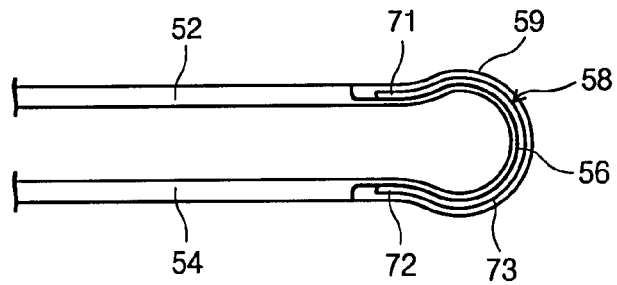
Figure 7B:
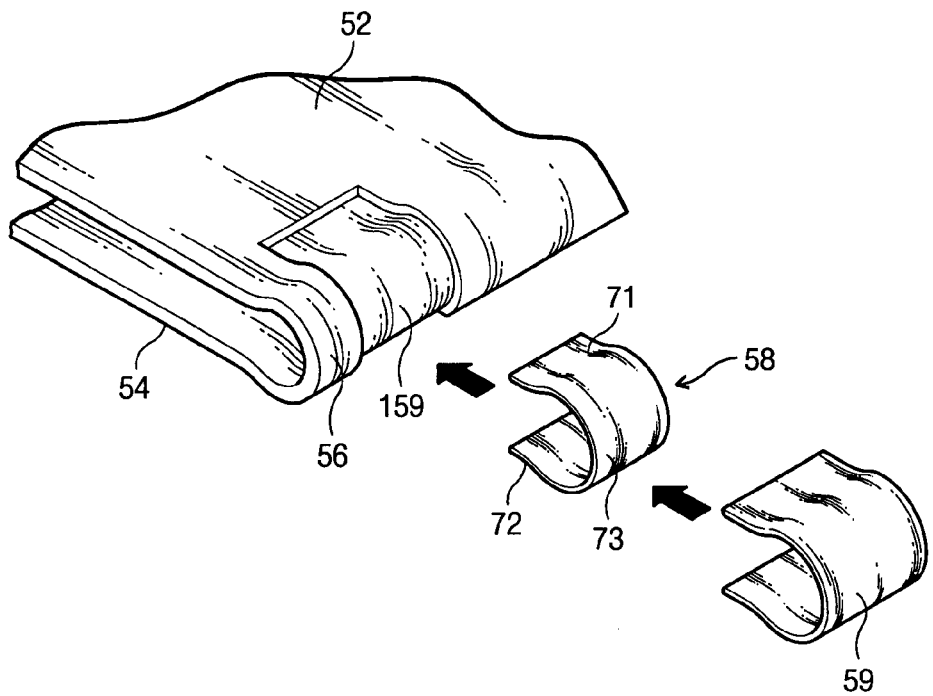
Figure 7C:
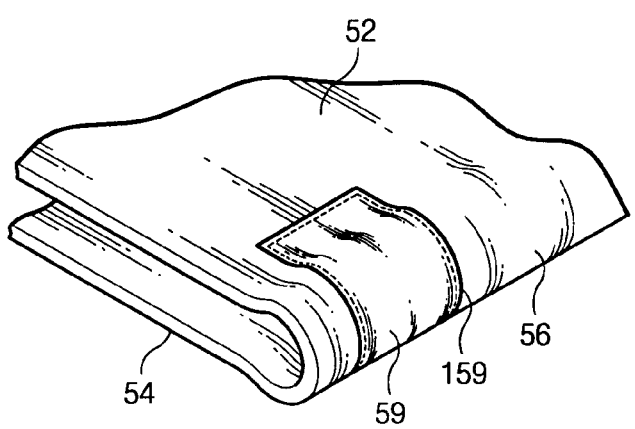

FIGS. 7A, 7B, and 7C show a third embodiment of protective case 50. A receptacle 159 is formed on connecting member 56 to accommodate elastic member 58 and hinge cover 59. The thickness of connecting member 56 may be made the same as the summation of the thickness of elastic member 58, the thickness of the portion of connecting member on which receptacle 158 is formed, and the thickness of the hinge cover. Hinge cover 59 is attached to receptacle 159 of connecting member 56 to cover elastic member 58 and receptacle 159 by using an adhesive or a thread as shown in FIGS. 2 and 3. Thus, elastic member 58 and receptacle 159 hidden by hinge cover 59 cannot be seen.

In another embodiment, hinge cover 59 is formed from an outer surface of connecting member 56 by cutting hinge cover 59 off a detaching portion of connecting member 56. One end of hinge cover 59 is not cut off from connecting member 56 while the other ends are taken off from and detached from the detaching portion of connecting member 56. After elastic member 58 is inserted between hinge cover 59 and connecting member 56 through the other ends, hinge cover 59 is attached to the detaching portion of connecting member 56 to cover detaching portion and elastic member 58.

Referring now to FIG. 8, a hand held computer 200 includes a top housing 230, a base housing 232, and connecting housing 226 joining top housing 230 and base housing 232. Various functions of switches for operating hand held computer 200 are located on a switch or key section 243 of palm top computer 200. Top housing 230 includes a monitor screen 235 and keys or switches 241 located on switch section 243 of computer 200 and may have a non-switch or non-key section 242 on which switches 241 are not located. Connecting housing 226 and base housing 232 may have switch section 243 and non-switch section 242.

Since hand held computer 200 does not include any hinge comparable to portion 26 of portable computer 20 shown in FIG. 2, elastic member 258 is inserted into or attached to the area of connecting member 256 or receptacle 269 formed on connecting member 256 corresponding to non-switch section 242 of hand held computer 200, and then connecting cover 259 is attached to connecting member 256 to cover elastic member 258 and receptacle 269 of protective cover 250. A top cover 252 covers top housing 230, and a base cover 254 covers base housing 232 while connecting housing 226 is inserted into connecting member 256. Elastic member 258 causes connecting member 256 to hold non-switch section 242 of hand held computer 200 through connecting member 256. In order words, neither elastic member 58 nor hinge cover 59 depress any of the keys or switches 241 when the cover is closed. A button 261 formed on a band 260 is latched into button hole 262 of protective cover 250. A non-flexible plate may attached to the inside of flexible and soft top cover 252 to cover and further protect monitor screen 235. In order to connecting member 256 to tightly hold non-key portion 242 and avoiding slipping to clip off and being uncovered in a closed position, a first diametric dimension of non-key portion 242 is bigger than a second diametric dimension of elastic member 258 while in a rest position and while not embracing non-key portion 242. The protective case 250 is uncovered from portable computer 200 by being slipped to clip off from non-key portion 242 when a user use portable computer 20. In another embodiment, user may use the computer 200 during uncovering only a second leaf 252 from top case 230 without clipping off elastic member 258 or slipping elastic member from computer 200.

As described above, according to the principles of the present invention, it is very convenience for an user to carry the portable computer covered by a relatively flexible, small, light protective case and to easily detach the protective cover from the portable computer, since the protective cover is not bulky in size and includes a top cover, a base cover, and a connecting member which are made of flexible, small, light material such as leather. Moreover, it provides a protective cover with a low production cost, a light weight and flexible cover since only a non-switch section or a hinge portion of the computer is inserted into the connecting member having the elastic member which is not a soft portion of protective cover.

This invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A protective case for a portable computer, comprising:
   said portable computer including abase housing, a hinge formed on said base housing, and a top housing containing a display screen and having one end rotatably coupled to said hinge of said base housing;
   a cover comprised of a first leaf joined by a bendable connecting member to a second leaf, said first and said second leaf spaced apart from each other and covering an outer surface of said base housing and an outer surface of said top housing, respectively, while said connecting member is inserted around and aligned along both said hinge of said base housing and said one end of said top housing, said connecting member having a portion contacting said hinge of said base housing of said portable computer;

a receptacle formed on an outer circumferential surface of said portion of said connecting member of said cover; and an elastic member disposed within said receptacle to be inserted around and fixed to said portion of said connecting member, exhibiting a closed state embracing and holding said portion of said connecting member against said hinge of said base housing of said portable computer.

2. The protective case of claim 1, said bendable connecting members exhibiting a first diametric dimension while said first leaf and said second leaf are in a closed position for covering said base housing and said top housing, respectively, and said elastic member exhibiting a second and lesser diametric dimension while in a rest position and while not embracing said portion of said connecting member.

3. The protective case of claim 1, wherein said elastic members are made of one of a steel plate and a plastic plate.

4. The protective case of claim 1, further comprised of a second cover attached to an outer surface of said elastic member and and covering said elastic member after said elastic member has been inserted around said receptacle.

5. A protective case for a portable computer including a base housing, a top housing containing a display screen and attached to said base housing, and a connecting housing formed one end of said top housing, said connecting housing having a non-key section and a key section, comprising:

a cover including a first leaf joined by a bendable connecting member to a second leaf, said first leaf and said second leaf spaced apart from each other and covering an outer surface of said base housing and an outer surface of said top housing, respectively, while said connecting member is inserted around said connecting housing;

a receptacle formed on an outer circumferential and rounded surface of said connecting member; and an elastic member disposed within said receptacle to be inserted around and fixed to said connecting member, exhibiting a close state embracing and holding said connecting member against said non-key section of said connecting housing of said portable computer.

6. The protective case of claim 5, said bendable connecting member exhibiting a first diametric dimension while said first leaf and said second leaf are in a closed position, and said elastic member exhibiting a second and lesser diametric dimension while in a rest position and while not embracing and holding said non-key portion of said connecting member against said non-key section of said connecting housing.

7. The protective case of claim 5, wherein said first leaf, said second leaf, and said connecting member are formed in a single body.

8. The protective case of claim 5, further comprised of:
a band extended from said first leaf, including a button; and
a button hole attached to said second leaf and connected to said button in order to connect said first leaf and said second leaf.

9. The protective case of claim 5, further comprised of:
hook material connected to said first leaf, and
loop material connected to said second leaf, mating said hook material in order to connect said first leaf and said second leaf.

10. The protective case of claim 5, wherein said elastic member is made of a plastic material while said cover is made of soft material.

11. The protective case of claim 5, wherein said elastic member is made of an elastic thin sheet while said cover is made of leather.

12. The protective case of claim 5, said elastic member having a predetermined shape same as said non-key section of said portable computer.

13. The protective case of claim 5, further comprised of an auxiliary cover attached to said elastic member and said non-key portion of said cover, covering said elastic member after said elastic member has been inserted around said non-key portion of said connecting member.

14. The protective case of claim 5, said receptacle having a depth same as a thickness of said elastic member.

15. The protective case of claim 5, wherein said first leaf and said second leaf are spaced apart from each other when said connecting member is inserted around said non-key section of connecting housing of said portable computer.

16. A protective case for a portable computer including a base housing, a hinge formed on said base housing, and a top housing containing a display screen and having one end rotatably coupled to said hinge of said base housing, comprising:

a cover including a first leaf joined by a bendable connecting member to a second leaf, said first leaf and said second leaf spaced apart from each other and engaging an outer surface of said base housing and an outer surface of said top housing of said portable computer, respectively, while said connecting member is inserted around and aligned along both said hinge of base housing and said one end of said top housing, said connecting member having a portion contacting said hinge of said base housing;

a receptacle formed on an outer circumferential surface of said portion of said connecting member; and an elastic member disposed within said receptacle to be inserted around and fixed to said portion of said connecting member, embracing and holding said portion of said connecting member against said hinge of said base housing.

17. The protective case of claim 16, said connecting member exhibiting a first diametric dimension while said first leaf and said second leaf are in a closed position, and said elastic member exhibiting a second and lesser diametric dimension while in a rest position and while not embracing said portion.

18. The protective case of claim 17, wherein said first leaf, said second leaf, and said connecting member are formed in a single body.

19. The protective case of claim 17, further comprised of:
a band extended from said first leaf, including a button; and
a button hole attached to said second leaf and connected to said button in order to connect said first leaf and said second leaf.

20. The protective case of claim 17, further comprised of:
hook material connected to said first leaf; and
loop material connected to said second leaf, mating said hook material in order to connect said first leaf and said second leaf.

21. The protective case of claim 16, wherein said elastic member is made of a plastic material while said cover is made of soft material.

22. The protective case of claim 16, wherein said elastic member is made of an elastic thin sheet while said cover is made of leather.

23. The protective case of claim 16, further comprised of a plurality of elastic members attached to one of a plurality of portions of said connecting member, holding said portions of said connecting member against said hinge of said portable computer.

24. The protective case of claim 16, said elastic member having a predetermined shape same as said hinge of said portable computer, fitting an outer circumferential surface of said hinge of said portable computer.

25. The protective case of claim 16, further comprised of a second cover attached to said elastic member, covering said elastic member after said elastic member has been fixed to said portion of said connecting member.

26. The protective case of claim 16, said receptacle having a depth same as a thickness of said elastic member.

27. The protective case of claim 16, wherein said first leaf and said second leaf are spaced apart from each other when said connecting member is inserted around said hinge of said base housing of said portable computer.

28. The protective case of claim 16, wherein said elastic member includes two extended portions spaced apart from each other, and a first distance between said two extended portions is less than a second distance between said first leaf and said second leaf.

* * * * *